United States Patent
Bodin et al.

(10) Patent No.: US 7,788,063 B2
(45) Date of Patent: Aug. 31, 2010

(54) UTILIZING GROSS VEHICLE WEIGHT TO DETERMINE PASSENGER NUMBERS

(75) Inventors: William K. Bodin, Austin, TX (US); David Jaramillo, Lake Worth, FL (US); Calista J. Redmond, Washington, DC (US); Derral C. Thorson, Austin, TX (US); Thomas S. Whaples, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 12/020,633

(22) Filed: Jan. 28, 2008

(65) Prior Publication Data

US 2009/0192756 A1   Jul. 30, 2009

(51) Int. Cl.
*G01G 7/00*   (2006.01)
*G06M 11/04*   (2006.01)

(52) U.S. Cl. .................. 702/173; 187/392; 235/462.01; 702/129; 702/174

(58) Field of Classification Search .................. 702/129, 702/173, 174; 701/53, 200; 187/382; 177/133; 235/462.01
See application file for complete search history.

(56) References Cited

U.S. PATENT DOCUMENTS

| | | | |
|---|---|---|---|
| 4,839,835 A | | 6/1989 | Hagenbuch |
| 5,411,118 A | * | 5/1995 | Thangavelu et al. ......... 187/392 |
| 5,998,741 A | | 12/1999 | Beshears et al. |
| 6,845,339 B2 | | 1/2005 | Winkler et al. |
| 6,923,375 B2 | * | 8/2005 | Stefani .................. 235/462.01 |

* cited by examiner

*Primary Examiner*—John H Le
(74) *Attorney, Agent, or Firm*—Dillon & Yudell LLP

(57) ABSTRACT

A method, system, and computer program for determining the number of passengers riding on a vehicle in real time is presented. A total weight of passengers on the vehicle is divided by an estimated weight of each of the passengers to estimate how many passengers are on the vehicle in real time.

3 Claims, 4 Drawing Sheets

UTILIZING GROSS VEHICLE WEIGHT TO DETERMINE PASSENGER NUMBERS

BACKGROUND OF THE INVENTION

The present invention relates in general to computers, and in particular to computer software. Still more particularly, the present invention relates to a system, method and computer program product for determining passenger levels in vehicles.

SUMMARY OF THE INVENTION

A method, system, and computer program for determining the number of passengers riding on a vehicle in real time is presented. A total weight of passengers on the vehicle is divided by an estimated weight of each of the passengers to estimate how many passengers are on the vehicle in real time.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

Figure 1:
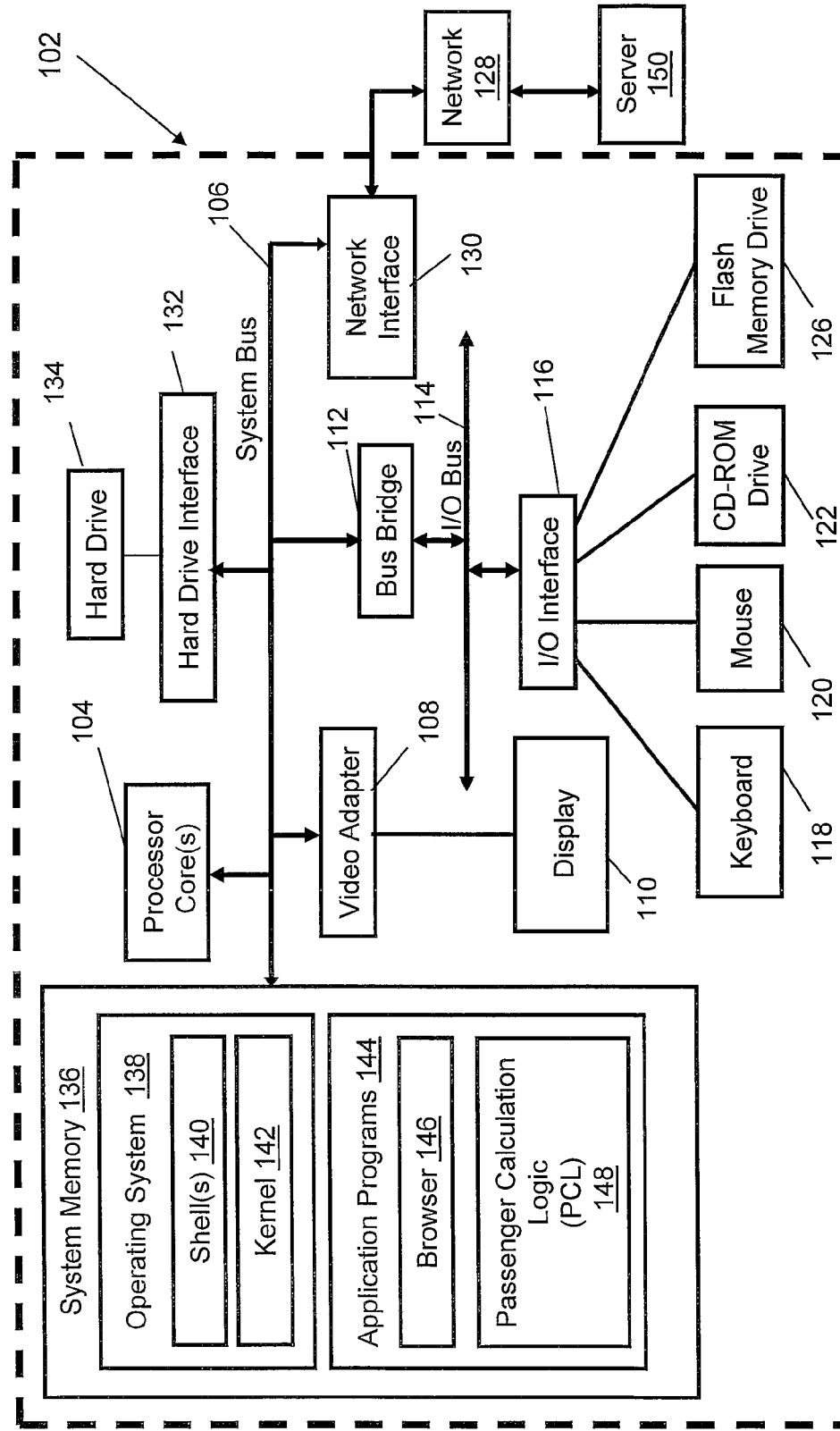
FIG. 1 is a block diagram of a data processing system in which the present invention may be implemented.

With reference now to FIG. 1, there is depicted a block diagram of an exemplary computer 100 in which the present invention may be implemented. Computer 102 includes one or more processor cores 104 that are coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Computer 102 is able to communicate with a software deploying server 150 via a network 128 using a network interface 130, which is coupled to system bus 106. Network 128 may be an external network such as the Internet, or an internal network such as an Ethernet or a Virtual Private Network (VPN). Note the software deploying server 150 may utilize a same or substantially similar architecture as computer 102.

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (also called a command processor) is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software deploying server 150.

Application programs 144 in computer 102's system memory (as well as software deploying server 150's system memory) also include a Passenger Calculation Logic (PCL) 148. PCL 148 includes code for implementing the processes described in FIGS. 2-4.

The hardware elements depicted in computer 102 are not intended to be exhaustive, but rather are representative to highlight essential components required by the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Note further that, in a preferred embodiment of the present invention, software deploying server 150 performs all of the functions associated with the present invention (including execution of PCL 148), thus freeing computer 102 from having to use its own internal computing resources to execute PCL 148.

Figure 3:
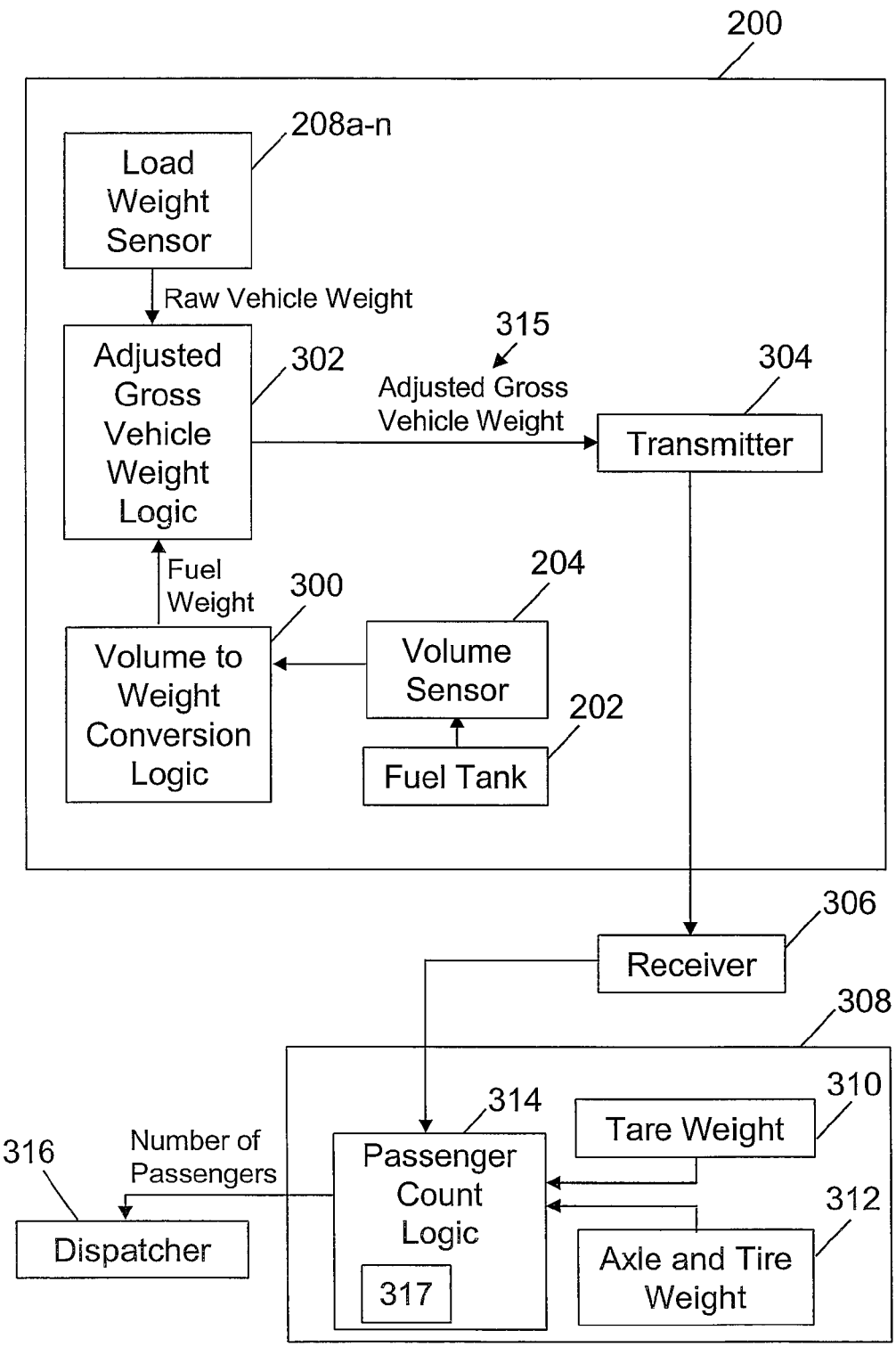
FIG. 3 illustrates an overall system and data flow for determining the number of passengers.

Note also server 150 and computer 308, shown in FIG. 3 may utilize a similar construction and logic for computer 102.

Figure 2:
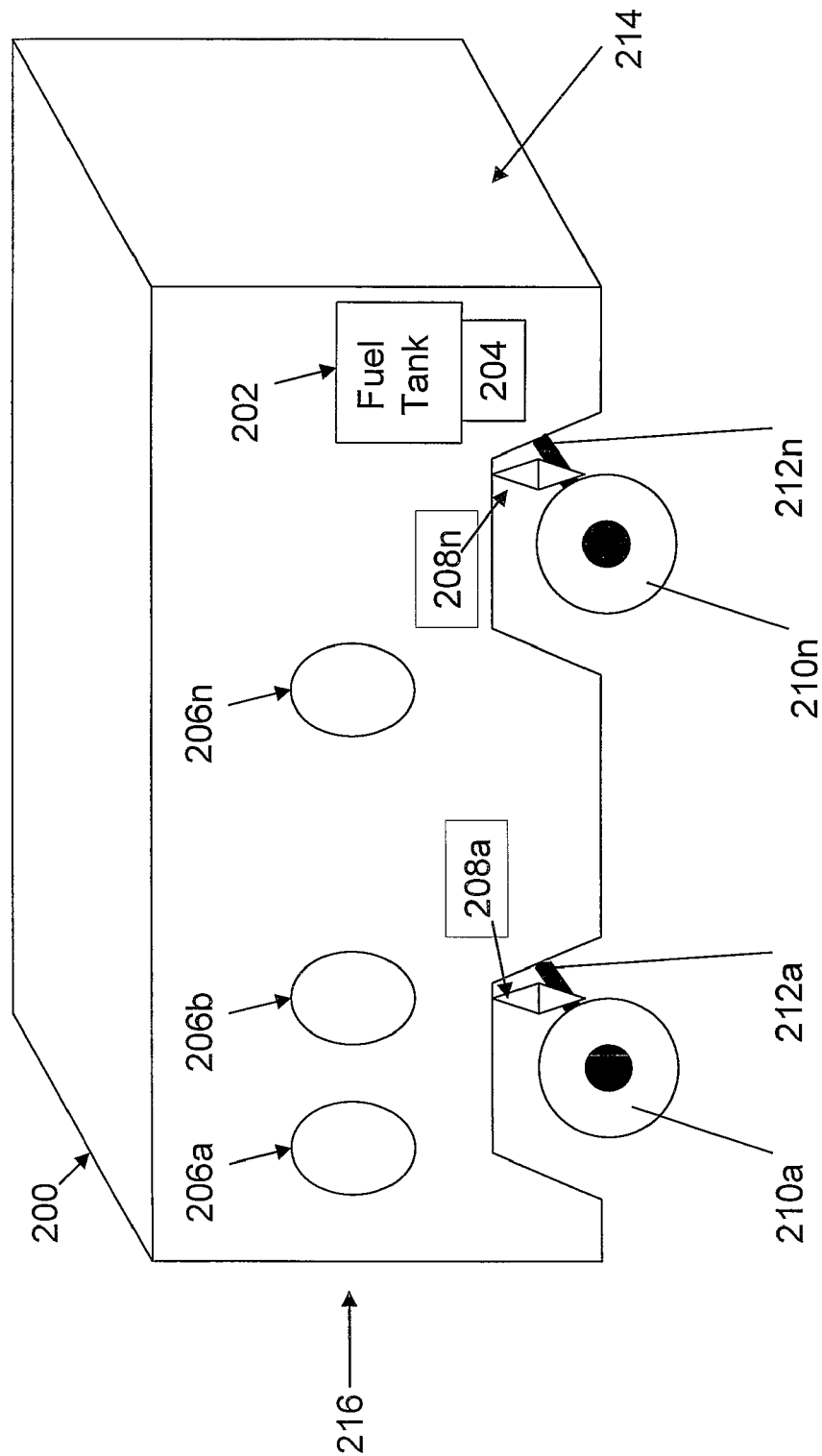
FIG. 2 depicts exemplary components on a vehicle for measuring the raw vehicle weight and fuel weight of the vehicle.

With reference now to FIG. 2, a high level illustration detailing a vehicle 200, on which passengers 206a-n are riding, is presented. Axle sensors 208a-n, where n is an integer, measure the raw vehicle weight of vehicle 200. The raw vehicle weight of vehicle 200 is equal to the Gross Vehicle Weight (GVW) of vehicle 200 minus the weight of the wheels 210a-n and axles 212a-n. The GVW of vehicle 200 is equal to a total weight of vehicle 200, to include the weight of the vehicle's chassis 214, body 216, wheels 210a-n, axles 212a-n, drive train (not shown), cargo (including passengers 206a-n), fuel in fuel tank 202, etc. Fuel sensor 204 measures the volume of fuel held by fuel tank 202. Note that the weight of the passengers 206a-n may include their clothing and any personal items brought on to the vehicle, such as laptops, backpacks, suitcases, luggage, etc.

With reference now to FIG. 3, a high level diagram illustrating a flow of data for determining a number of passengers on a vehicle is presented.

The volume of fuel in fuel tank 202 is measured by fuel sensor 204. This volume is converted into a weight value using a Volume to Weight Conversion Logic 300. The Adjusted Gross Vehicle Weight Logic 302 subtracts the weight of the fuel in fuel tank 202, as determined by the Volume to Weight Conversion Logic 300, from the raw vehicle weight of vehicle 200 to generate an adjusted gross vehicle weight 315. That is, the adjusted gross vehicle weight 315 is equal to the raw vehicle weight (defined above in FIG. 2) minus the weight of the fuel in fuel tank 202. The adjusted gross vehicle weight 315 is then sent to a transmitter 304, which sends the adjusted gross vehicle weight 315 to a receiver 306. Receiver 306 may be located at a dispatcher's office or any other location in which a real-time passenger count for the vehicle 200 may be utilized.

Receiver 306 is coupled to a computer 308, which includes a passenger count logic 314 for calculating how many passengers are on vehicle 200 at any point in time using the tare weight 310 of the vehicle 200, the adjusted gross vehicle weight of vehicle 200, and the axle and tire weight 312 of vehicle 200. As represented in FIG. 3, passenger count logic 314 subtracts the tare weight 310 and subtracts the axle and tire weight 312 from the adjusted gross vehicle weight 315 to arrive at a value 317. Passenger count logic 314 converts value 317 into an estimated number of passengers on vehicle 200, which can be utilized by a dispatcher 316, or any other party, computer or logic, which can utilize the number of passengers on vehicle 200 to improve usage of vehicle 200.

Note that the tare weight 310 of the vehicle 200 is a predetermined value established by documentation from vehicle manufacturer. If this information is not available, the tare weight 310 of the vehicle can also be determined by weighing the empty vehicle 200 on an external scale and subtracting fuel weight. Similarly, the Axle and Tire Weight 312 of the vehicle is a predetermined value established by documentation from vehicle manufacturer and the tire manufacturer. Thus, this value includes the weight of the vehicle below the Axle Sensors 208a-n, to include the vehicle axles, wheels, tires, etc.

As stated above, the Passenger Logic 314 determines (estimates) the number of passengers in the vehicle in real-time. The number of passengers in the vehicle is calculated by adding the Axle and Tire Weight 312 to the Adjusted Gross Vehicle weight 315, subtracting the Tare Weight 310, and dividing by a typical adjusted passenger weight. The typical adjusted passenger weight is determined using preset information such as, but not limited to, average passenger weight, area of vehicle use, holiday of use, day of week, time of day, season of use, average weight of passenger personal items, etc. For example, individual passengers may weigh more in the winter than in the summer due to heavy coats, while holiday shoppers (with their packages) may each weigh more than passengers on a workday. Such average weights can be estimated or calculated using statistical analysis of past measurements, etc.

Using the value for the number of passengers on the vehicle 200, where the vehicle 200 is a bus, Dispatcher 316 can dynamically change the operation of the vehicle 200 and other similar vehicle(s). Dispatcher 316 may be a program on a computer, or an end-user who has interpreted the value for the number of passengers on the bus. Changing the operation of the vehicle(s) may include, but is not limited to, increasing or decreasing length of vehicle routes, the number of buses on routes, the size of buses on given routes, types of busses on given routes, accessory items on buses on given routes, etc.

Figure 4:
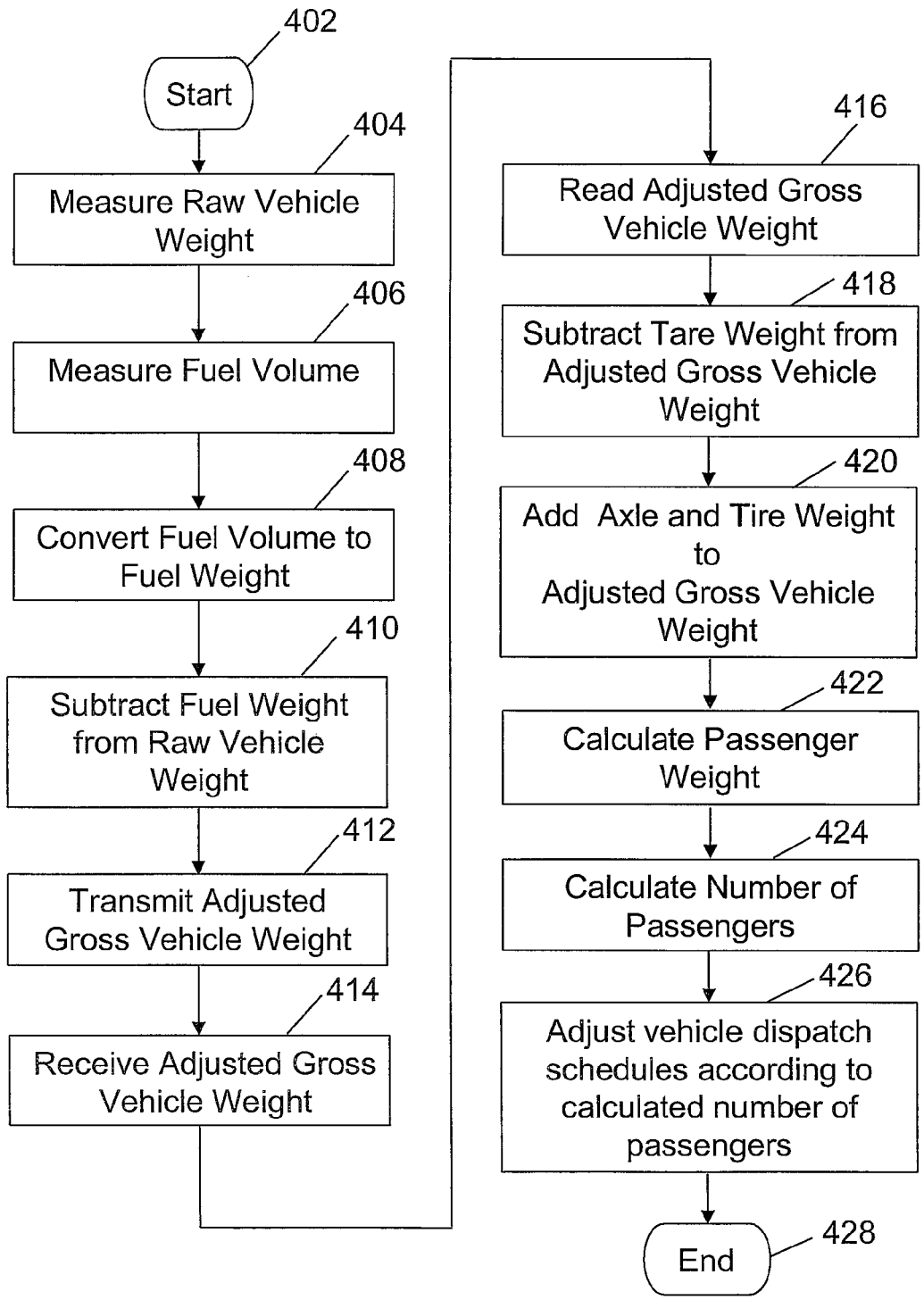
FIG. 4 is a high-level logical flowchart of an exemplary set of steps performed to determine passenger levels in vehicles.

With reference now to FIG. 4, a high-level flow chart of exemplary steps taken to determine a number of passengers on vehicles is presented. After initiator block 402, the raw vehicle weight (weight on the axles of a vehicle) for the vehicle is measured (block 404). The vehicle's current fuel level is measured (block 406) as a unit of volume. This value for volume is then converted to a weight value (block 408). The weight of the fuel is subtracted from the weight on the axles (raw vehicle weight) to generate an adjusted gross vehicle weight (block 410). The adjusted gross vehicle weight is communicated via a transmission method (block 412), and received (block 414) at a remote location. The adjusted gross vehicle weight is read by a receiving computer (block 416), which calculates a total passenger weight (block 422) by adding the determined Axle and Tire Weight (block 420), and subtracting the vehicle Tare Weight (block 418) from the adjusted gross vehicle weight. The number of passengers is then calculated by dividing the calculated passenger weight (block 422) by the typical adjusted passenger weight (block 424). Following this the vehicle dispatch schedules can be adjusted according to the calculated number of passengers (block 426). The process terminates at terminator block 426.

Although aspects of the present invention have been described with respect to a computer processor and software, it should be understood that at least some aspects of the present invention may alternatively be implemented as a program product for use with a data storage system or computer system. Programs defining functions of the present invention can be delivered to a data storage system or computer system via a variety of signal-bearing media, which include, without limitation, non-writable storage media (e.g. CD-ROM), writable storage media (e.g. a floppy diskette, hard disk drive, read/write CD-ROM, optical media), and communication media, such as computer and telephone networks including Ethernet. It should be understood, therefore, that such signal-bearing media, when carrying or encoding computer readable instructions that direct method functions of the present invention, represent alternative embodiments of the present invention. Further, it is understood that the present invention may be implemented by a system having means in the form of hardware, software, or a combination of software and hardware as described herein or their equivalent.

Having thus described the invention of the present application in detail and by reference to preferred embodiments thereof, it will be apparent that modifications and variations are possible without departing from the scope of the invention defined in the appended claims.

What is claimed is:

1. A method of determining passenger headcounts in vehicles, the method comprising:
   measuring a total weight of passengers on a vehicle;
   a data processing device estimating an average weight for each of the passengers, wherein the average weight is estimated according to a current season, a time of day, a day of week, a location of the vehicle and an average weight of carry on baggage;

the data processing device dividing the total weight of the passengers by the average weight of the passengers to determine, in real time, a total number of passengers on the vehicle; and dynamically adjusting vehicle routes by adjusting a total number of vehicles on a route, lengths of the vehicle routes, and vehicle sizes and types deployed on the vehicle routes based on the total number of passengers on the vehicle.

2. A system comprising:

a processor;

a data bus coupled to the processor;

a memory coupled to the data bus; and a computer-usable medium embodying computer program code, the computer program code comprising instructions executable by the processor and configured for determining passenger headcounts in vehicles by:

measuring a total weight of passengers on a vehicle;

estimating an average weight for each of the passengers, wherein the average weight is estimated according to a current season, a time of day, a day of week, a location of the vehicle and an average weight of carry on baggage;

dividing the total weight of the passengers by the average weight of the passengers to determine, in real time, a total number of passengers on the vehicle; and dynamically adjusting vehicle routes by adjusting a total number of vehicles on a route, lengths of the vehicle routes, and vehicle sizes and types deployed on the vehicle routes based on the total number of passengers on the vehicle.

3. A computer-readable medium having a plurality of instructions processable by a machine embodied therein, wherein the plurality of instructions, when processed by the machine, cause the machine to perform a method, the method comprising:

measuring a total weight of passengers on a vehicle;

estimating an average weight for each of the passengers, wherein the average weight is estimated according to a current season, a time of day, a day of week, a location of the vehicle and an average weight of carry on baggage;

dividing the total weight of the passengers by the average weight of the passengers to determine, in real time, a total number of passengers on the vehicle; and dynamically adjusting vehicle routes by adjusting a total number of vehicles on a route, lengths of the vehicle routes, and vehicle sizes and types deployed on the vehicle routes based on the total number of passengers on the vehicle.

* * * * *